US006950850B1

(12) United States Patent
Leff et al.

(10) Patent No.: US 6,950,850 B1
(45) Date of Patent: Sep. 27, 2005

(54) SYSTEM AND METHOD FOR DYNAMIC RUNTIME PARTITIONING OF MODEL-VIEW-CONTROLLER APPLICATIONS

(75) Inventors: Avraham Leff, New Hempstead, NY (US); James Thomas Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 09/703,187

(22) Filed: Oct. 31, 2000

(51) Int. Cl.[7] ............................................. G06F 15/16
(52) U.S. Cl. ........................ 709/203; 704/8; 704/23; 707/10; 707/100; 707/102; 707/200; 709/320; 713/100; 714/38; 717/108; 717/130; 717/158; 717/164; 717/170; 717/175
(58) Field of Search ................................ 709/203, 328; 717/108, 130, 158, 164, 170, 175

(56) References Cited

U.S. PATENT DOCUMENTS

| | | | |
|---|---|---|---|
| 5,381,534 A * | 1/1995 | Shi .............................. | 709/203 |
| 5,457,797 A * | 10/1995 | Butterworth et al. ........ | 709/320 |
| 5,754,773 A * | 5/1998 | Ozden et al. ................ | 709/203 |
| 5,768,510 A * | 6/1998 | Gish ........................... | 709/203 |
| 5,922,044 A * | 7/1999 | Banthia ....................... | 709/203 |
| 5,970,490 A * | 10/1999 | Morgenstern ................ | 707/10 |
| 6,012,067 A * | 1/2000 | Sarkar ..................... | 707/103 R |
| 6,076,091 A * | 6/2000 | Fohn et al. .................. | 707/102 |
| 6,199,099 B1 * | 3/2001 | Gershman et al. .......... | 709/203 |
| 6,199,108 B1 * | 3/2001 | Casey et al. ................. | 709/220 |
| 6,237,092 B1 * | 5/2001 | Hayes, Jr. .................... | 713/100 |
| 6,253,238 B1 * | 6/2001 | Lauder et al. .............. | 709/217 |
| 6,263,346 B1 * | 7/2001 | Rodriquez ................... | 707/201 |
| 6,275,790 B1 * | 8/2001 | Yamamoto et al. ............ | 704/8 |
| 6,301,557 B1 * | 10/2001 | Miller et al. ................ | 704/223 |
| 6,327,594 B1 * | 12/2001 | Van Huben et al. ........ | 707/200 |
| 6,345,278 B1 * | 2/2002 | Hitchcock et al. .......... | 707/100 |
| 6,604,209 B1 * | 8/2003 | Grucci et al. .................. | 714/38 |

OTHER PUBLICATIONS

G.E. Krasner et al., "A Cookbook for Using the Model-View-Controller User Interface Paradigm in Smalltak-80," Journal of Object-Oriented Programming, pp. 26-49, Aug./Sep. 1988.

(Continued)

*Primary Examiner*—Ario Etienne
*Assistant Examiner*—Michael Y. Won
(74) *Attorney, Agent, or Firm*—Rafael Perez-Pineiro; Ryan, Mason & Lewis, LLP (57) ABSTRACT

Methods and apparatus for dynamic runtime partitioning of network-based client/server applications using a Model-View-Controller pattern are provided. Such dynamic partitioning is accomplished by requiring that the application specify: (i) that access to the Model be done through an application programming interface (API) which allows the system runtime to dynamically allocate and access Model storage on the client and/or server; and (ii) that access to the View be done through an API which allows the system runtime to dynamically allocate and access View components on the client and/or server. This enables applications written and tested in such a manner (referred to herein as the "canonical form") to execute in a non-distributed mode or in a dynamically partitioned mode in which client/server issues are not a factor. This greatly facilitates development of the application. Furthermore, by specifying View components in an abstract, or "platform-independent" API, the application can run on multiple client devices without modifying the application. All that is required is a platform-specific implementation of the View components' API. Client platforms for the application can thus include, for example, applets, HTML browsers, and PDAs.

31 Claims, 7 Drawing Sheets

OTHER PUBLICATIONS

J. Coutaz, "PAC, an Object Oriented Model for Dialog Design," Human-Computer Interaction-INTERACT 1987 Proceedings, Elsevier Science Publishers, pp. 431-436, 1987.

Buschmann et al., "A System of Patterns," John Wiley & Sons, pp. 123-169, 1996.

K. Betz et al. "Developing Highly-Responsive User Interfaces with DHTML and Servlets," 19th IEEE International Performance, Computing and Communications Conference, IPCCC-2000, pp. 437-443, 2000.

Enterprise JavaBeans Technology, http://java.sun.com/products/ejb/, Sun Microsystems, Inc., 1 page, 1995-2003.

"Ultra Light Client Guide and Reference," IBM Corporation, Visual Age Smalltalk, Version 5.5, pp. 1-206, May 2001.

* cited by examiner

FIG. 2

```
public interface ViewAPI
{
    public ViewElement createViewElement(ViewType viewType, String name);   // 11-1
    public void remove ViewElement(String name);                             // 11-2
    public ViewElement getViewElement(String name);                          // 11-3
} public interface ViewElement
{
    public ViewProperty getViewProperty(String name);                        // 11-4
    public void setViewProperty(String name, PropertyValue value);           // 11-5
    public void registerController                                           // 11-6
        (Controller controller, ControllerArguments args, UserInteraction event);
}
```

FIG. 3

```
public interface ModelAPI
{
    public ModelHome locateHome (String homeName);                           // 12-1
} public interface ModelHome
{
    public ModelElement createModelElement (ModelElementKey key);            // 12-2
    public void removeModelElement (ModelElementKey key);                    // 12-3
    public ModelElementSet Query (QueryCriteria criteria);                   // 12-4
} public interface ModelElement
{
    public ModelElementKey getKey();                                         // 12-5
}
```

FIG. 4

```
                    30
                    │
    ┌───────────────────────────────────────────────────────────────┐
    │  // Controller                                                │
30-0 →  public void ProcessSearchRequest
        {
           // access the view components
30-10→     TextField  inputName    = ViewAPI.getViewElement(inputKey);
30-20→     String     employeeName = inputName.getProperty("data");

// access the model
30-30→     EmployeeHome employeeHome = ModelAPI.locateHome("employees");
           // query the model
30-40→     Employee[]  results =
               employeeHome.Query (new QueryCriteria ("findByName," employeeName));

// generate the next view, and return to client
30-50→     setView(BuildSearchResultsView (name, results));
        }

// View Generation code 30-60→  public void CreateInitialView ()
        {
           // create the top-level frame
30-70→     Frame     frame     = ViewAPI.createViewElement ("frame," frameKey);
30-80→     TextField inputName = ViewAPI.createViewElement ("textfield," inputKey);

// associate a controller with user-input into the textfield
30-90→     inputName.registerController (ProcessSearchRequest, null, TextField.CHANGE);
        }
```

SYSTEM AND METHOD FOR DYNAMIC RUNTIME PARTITIONING OF MODEL-VIEW-CONTROLLER APPLICATIONS

FIELD OF THE INVENTION

The present invention is related to network-based client/server applications, for example, executing over the world wide web (e.g., Internet/Intranet) and, more particularly, to methods and systems for dynamic runtime partitioning of network-based client/server applications using a Model-View-Controller pattern.

BACKGROUND OF THE INVENTION

Interactive applications (i.e., computer software programs written to perform particular functions in accordance with user interaction) can be usefully described as examples of the Model-View-Controller (MVC) design pattern. In this pattern, an interactive application is divided into three components. The "Model" contains data used by the application. The "View(s)" displays information about the data to the user. The "Controller(s)" handle user input to the application.

In the original MVC design pattern, Views and Controllers together comprise the user interface, and an event handling mechanism processes user interactions so as to ensure consistency between the user interface and the model. More generally, the "low-level Controller" associated with a "low-level View element" (e.g., the software that processes the activation of a mouse button on a clickable on-screen button) can be combined into a single "Presentation" or "high-level View component." The term "Controller" is then used to denote "high-level" software that connects the Model and View components so as to modify the Model as a function of user interaction and to modify the View as a function of the Model's state. We use the term MVC in this, more generalized, sense which actually corresponds more closely to the Presentation-Abstraction-Control (or PAC) architecture pattern. Although originally used to describe only the first pattern, the term MVC is commonly used to describe the more general pattern.

Deployed client/server applications are partitioned so that one portion of the application runs on the server and the other portion on the client. In the case of an interactive (i.e., MVC) application, partitioning determines which portions of the Model, View, and Controller reside on the client and which reside on the server. For example, in HTML-based (HyperText Markup Language-based) browser environments, the entire Model, View, and Controller reside on the server and the client device is used only to render the View. Conversely, in so-called "fat client" applications, much of the Model, View, and Controller reside on the client with a small portion residing on the server.

Whatever the partitioning choice, currently, the choice must be made either in the application's design phase or, at the latest, during application implementation. Controller code is typically "location-dependent" meaning that it is explicitly written to execute on the client or on the server. Even when the Controller is not location-dependent, current View technologies strongly determine a static partitioning of the application. For example, in the current state of the art, because an application's View components are tightly coupled with the manner in which the components are rendered, the choice of a given View technology strongly determines where code involving those components must execute. Thus, if the View consists of HTML components rendered in a web browser, the View components will typically reside on the server because it is non-trivial for a web browser to include code that generates HTML. Alternatively, if the View components are elements of Sun Microsystems™ Swing libraries, the components must reside on the client because Swing components require local display media.

A similar situation applies with regard to the application's Model. Typically, the Model is statically partitioned because the data must physically reside either on the client or on the server. For example, allocating Model storage on either the client-side or the server-side of the application ties Controllers that access that Model to execute on only that side of the application.

Techniques exist in which Model storage is allocated on either the client or on the server but accessed by the Controller in a location-transparent way. These include database APIs (Application Programming Interfaces) such as ODBC (Open Database Connectivity) and JDBC (Java Database Connectivity). Although these techniques transparently make transient copies of portions of the data to the Controller, they require static partitioning of the Model, i.e., the database must reside on either the client or a server.

In other techniques, Controllers are statically partitioned between client and server. The client-side Controller handles initial event dispatching (e.g., button clicks), and the server-side Controller (which involves Model access) is co-located with the physical Model storage. The calling linkage between the partitioned Controller sections is achieved with a location-transparent runtime such as Remote Procedure Calls (RPC), Java Remote Method Invocation (RMI), and OMG CORBA (Object Management Group Common Object Request Broker Architecture). Such techniques also require static partitioning of the Model since persistent state is still located on a specific machine.

Writing applications in a location-dependent manner or in a statically partitioned manner has many disadvantages, some of which are now discussed.

First, application developers cannot defer partitioning decisions, both in terms of splitting function between the client and the server and in terms of selection of the client device, e.g., web browser, personal digital assistant or PDA, cellular phone. Deferring the decision is advantageous because it allows more accurate information about the deployment environment to be incorporated into the decision.

Further, remote Model access or Controller linkage to a remote Model incurs a performance penalty, since the data and parameters must be marshaled/demarshaled and copied over a network.

Also, performance evaluation of the application can involve only a specific partitioning of the application rather than also examining alternative partitionings of the application. Often, it is too costly to independently implement different partitionings of an application. For example, under a dual-MVC architecture, as described in: U.S. patent application identified as Ser. No. 09/500,208, filed on Feb. 8, 2000 in the name of Betz et al. and entitled: "Methods and Apparatus for Reducing the Number of Server Interactions in Network-based Applications Using a Dual-MVC Approach," the disclosure of which is incorporated by reference herein; and in K. Betz, A. Leff and J. Rayfield, "Developing Highly-Responsive User Interfaces with DHTML and Servlets," 19th IEEE International Performance, Computing, and Communications Conference—IPCCC-2000, some controllers execute on the client rather than the server, thus offloading work from the server to the client and reducing network communication, potentially improving performance. However, dual-MVC only provides a framework for such partitioning, without allowing the examination of the implications of various partitions. Static partitioning does not allow developers to take full advantage of the possibilities of dual-MVC.

Still further, application developers prefer to concentrate on the application's "look and feel" and "flow" as opposed to focusing on partition-specific issues that are independent of the application's behavior.

Lastly, application development and testing are harder in a distributed environment because of the required infrastructure, e.g., a web server, network connectivity, debugger.

The MVC design pattern was first introduced in the Smalltalk-80 programming environment, see G. E. Krasner and S. T. Pope, "A Cookbook for Using the Model-View-Controller User-Interface Paradigm in Smalltalk-80," Journal of Object-Oriented Programming, pp. 26–49, August/September 1988, SIGS Publications 1988. PAC was first described in J. Coutaz, "PAC, An Object-Oriented Model for Dialog Design," Human-Computer Interaction—INTERACT 1987 proceedings, pp. 431–436, Elsevier Science Publishers, 1987. See Buschmann et al., "A System of Patterns," pp. 123–169, John Wiley & Sons, 1996, for further background on the MVC and PAC design patterns. Unfortunately, the MVC and PAC design patterns are not concerned with issues associated with application deployment to a client/server environment such as how an application is partitioned between the client and the server.

Deployment to multiple platforms from a single-source View description is not new, e.g., see IBM Corporation™ VisualAge OpenClass libraries and Sun Microsystem™ Java AWT (Abstract Window Toolkit) which already provide similar functionality.

The IBM Corporation™ VisualAge for Java Ultra Light Client service offering (see http://www7.software.ibm.com/vad.nsf/Data/Document3141?OpenDocument&p=1&BCT=3&Footer=1, by Skyler Thomas and Pat Huff) provides server-side Swing-compliant View components which are transparently rendered on the client side by a lightweight client application. In contrast, as will be explained below, the present invention may use actual Swing components (in one embodiment) on the client side, and corresponding non-visual server-side components that can be converted to and from the client-side components.

SUMMARY OF THE INVENTION

The present invention provides methods and systems which enable Controllers to execute in a dynamically partitioned manner, meaning that decisions about where a Controller will execute or where a View or Model element will be instantiated occur after the application is written and without modification to the application. Dynamic partitioning may be done on a per-Controller basis, meaning that individual Controllers will execute on either the client or server but not on both. Alternatively, dynamic partitioning may be done on a per-Controller-invocation basis, meaning that the execution location of a Controller may change during runtime execution as conditions warrant (e.g., network congestion, cache contents).

In one aspect of the invention, such dynamic partitioning is accomplished by deploying one or more specific applications into a system runtime. Applications contain the necessary Model, View(s), and Controller(s) used to implement the application-dependent business logic and user interactions. It is to be understood that the "system runtime" includes the application-independent logic, communications network, and CPU (central processing unit) infrastructure used by deployed applications to communicate the required state (such as, for example, the Controller to be executed, the arguments used in the Controller's execution, and updates to the Model and View state) between client and server. Dynamic partitioning is accomplished by requiring that the application specify: (i) that access to the Model be done through an API which allows the system runtime to dynamically allocate and access Model storage on the client and/or server; and (ii) that access to the View be done through an API which allows the system runtime to dynamically allocate and access View components on the client and/or server. This enables applications written and tested in such a manner (referred to herein as the "canonical form") to execute in a non-distributed mode or in a dynamically partitioned mode in which client/server issues are not a factor. This greatly facilitates development of the application.

Furthermore, by specifying View components in an abstract, or "platform-independent" API, the application can run on multiple client devices without modifying the application. All that is required is a platform-specific implementation of the View components' API. Client platforms for the application can thus include, for example, applets, HTML browsers, and PDAs.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention provides a "canonical form" to describe MVC applications. One aspect of the canonical form is that it is independent of, and does not involve, issues related to deploying the application in a distributed client/server environment. The canonical form is therefore "single MVC" because the MVC description of the application relates to a single or non-distributed platform.

As will be illustrated below, the canonical form of an application according to the invention may comprise: (i) View components; (ii) Model/View APIs; (iii) Event Handlers (Controllers) and an Event Handler registration; and (iv) an Application lifecycle. As is known and as will be evident, the lifecycle of an application refers to the fact that objects or elements associated with the application can be created and deleted.

The inventive application form is "canonical" in the sense that MVC applications can be developed and tested in this form with the assurance that when the application is deployed to a specific client/server technology and/or its Controllers are partitioned between the client and the server that the application will be functionally identical to that of the canonical form.

Further, as will be illustrated below, the View components and Model and View APIs enable dynamic runtime partitioning of the application by allowing the application's Controllers to execute without change on either the client or server side. The invention provides a methodology to deploy, dynamically partition, and execute the application without changing the canonical form. Specifically, as will be illustrated below, the invention provides a methodology that describes how: (i) the Model and Controller portion of the application can execute on the server, while the View is rendered on the client (e.g., a web browser, or PDA); (ii) portions of the application's Model and Controller components can execute on either the client or the server, while the View is rendered on the client; (iii) the manner in which the application is partitioned (i.e., which parts of the Controller and Model reside on the client) and can be configured dynamically; (iv) the Model can be dynamically moved between the client and the server; and (v) the View can be dynamically moved between the client and the server.

Figure 1:
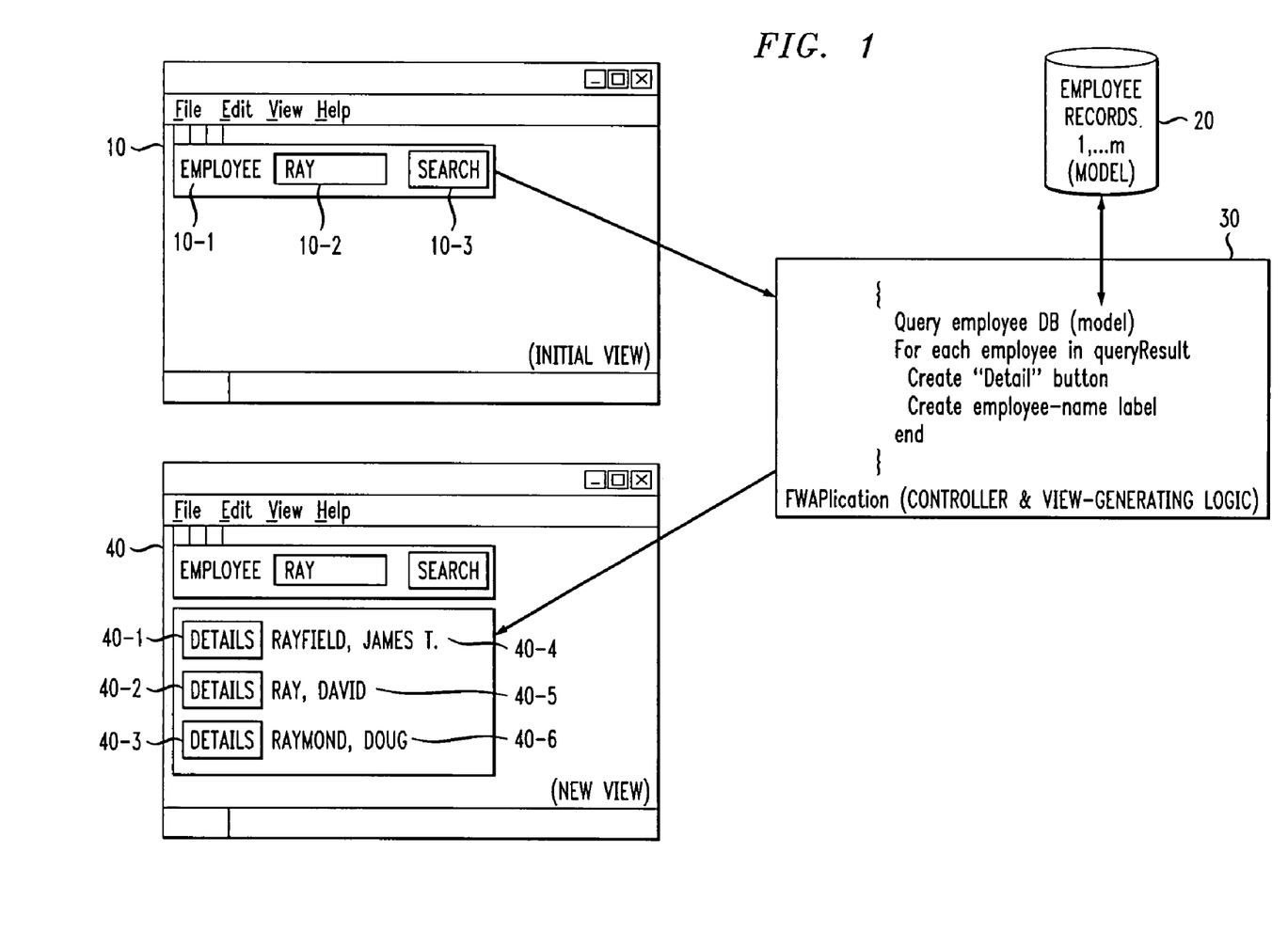
FIG. 1 is a block diagram illustrating a high-level representation of components comprising a single user-interaction with a sample canonical or single MVC application according to an embodiment of the present invention.

FIG. 1 shows a high-level representation of the components comprising a single user-interaction with a sample canonical or single MVC application. In FIG. 1, the application comprises an initial View 10 which comprises View elements 10-1, . . . 10-n. For example, the View contains a "search" button 10-3, an input field 10-2, and an "employee" label 10-1. A Model 20 contains a set of employee records 20-1, . . . 20-m. A FWAPlication or Flexible Web-Application Partitioning Application 30 comprises a Controller and View-generating logic. It is to be appreciated that the term "logic" as used herein is intended to refer to program code for performing a particular function(s). The Controller of the FWAPlication 30, given an employee name supplied in the input field 10-2, queries the Model 20 to determine the set of employees whose names begin with the specified text, e.g., "Ray."

A user interacts with the initial View 10 by typing the full or partial name of an employee into the input field. The View-generating Logic of the FWAPlication 30 creates a new View 40 that, for each employee in the result set, contains a row comprised of a clickable "details" button (40-1, 40-2 and 40-3) and a label that displays the employee's name (40-4 corresponding to 40-1, 40-5 corresponding to 40-2 and 40-6 corresponding to 40-3). The new View 40 is displayed to the user, who may then continue interacting with the application, e.g., by clicking on a "details" button to get more detailed information about an individual employee.

The high-level representation shown in FIG. 1 must be realized concretely as an application. Advantageously, as will be explained in detail below, applications written in the canonical form according to the present invention access the View through a View API and the Model through a Model API. The programming language and details of the APIs are not important, and those of ordinary skill in the art will realize that many alternatives are possible. The present invention requires only that a canonical form of an MVC application consistently access the View or Model through these APIs.

Figure 2:
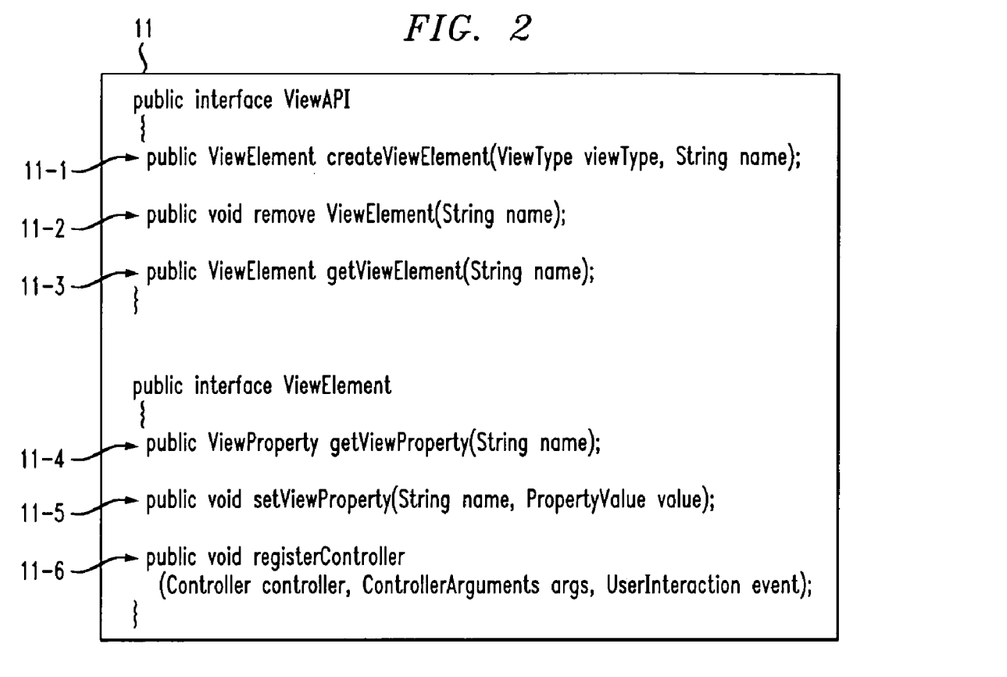
FIG. 2 illustrates an application programming interface in the canonical form to access the View according to an embodiment of the present invention.

An example of a View API is shown in FIG. 2. Specifically, FIG. 2 shows an API 11 in the canonical form to access the View. The API comprises methods to create and delete View components (11-1, 11-2), and to read and write or update the properties or state of individual View components (11-3 through 11-6).

It is to be appreciated that any programming model: (i) with a well-structured lifecycle API; and (ii) that requires that View elements have identity so that a View element can always be located through an associated key, can be used as the View API used in the present invention's canonical form to access the View. The Enterprise JavaBeans specification (http://java.sun.com/products/ejb/) is one example of such an API.

Figure 3:
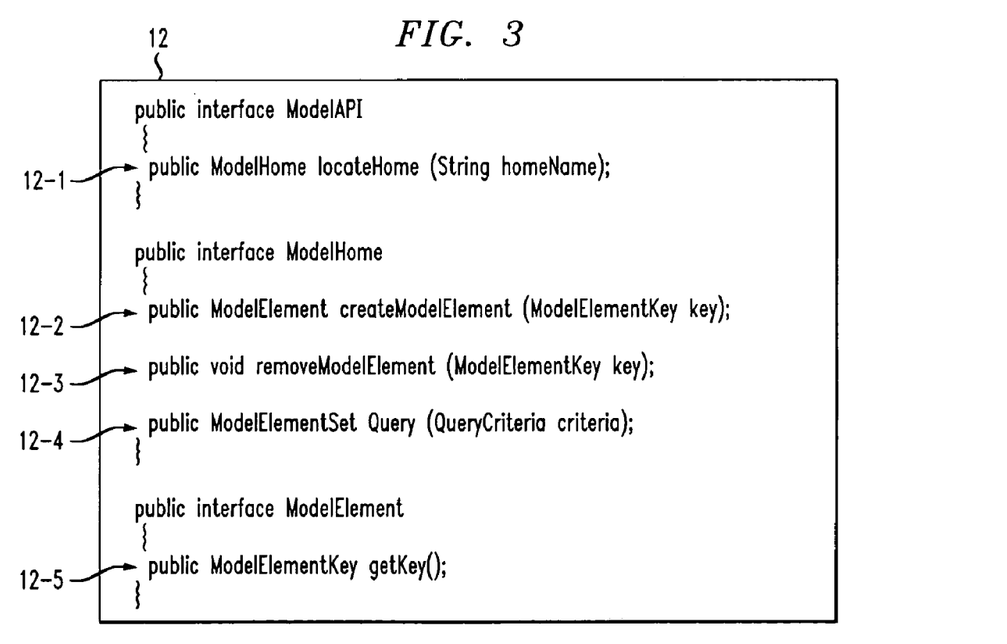
FIG. 3 illustrates an application programming interface in the canonical form to access the Model according to an embodiment of the present invention.

An example of a Model API is shown in FIG. 3. Specifically, FIG. 3 shows an API 12 used in the canonical form to access the Model. The API comprises methods to locate ModelHomes (12-1), and once a ModelHome is located, methods to create (12-2), query or find (12-4 and 12-5), and delete (12-3) Model elements.

It is to be appreciated that any programming model: (i) with a well-structured lifecycle API; and (ii) that requires that Model elements have identity so that a Model element can always be located through an associated key, can be used as the Model API used in the present invention's canonical form to access the Model. The Enterprise JavaBeans specification (http://java.sun.com/products/ejb/) is one example of such an API.

It is also to be understood that while the example of the View API above includes methods to create and delete View elements, and to read and write the properties or state of individual View elements, the Model API can also have the same or similar methods for performing the same or similar operations with respect to the Model elements. Likewise, while the example of the Model API above includes methods to locate, create, query and delete Model elements, the View API can also have the same or similar methods for performing the same or similar operations with respect to the View elements. Of course, the operations that can be performed by the APIs is not limited to these examples. That is, depending on the nature of application itself, other operations besides creating, finding (retrieving, querying), reading, updating and deleting of elements (Model elements and/or View elements) can be employed.

Figure 4:
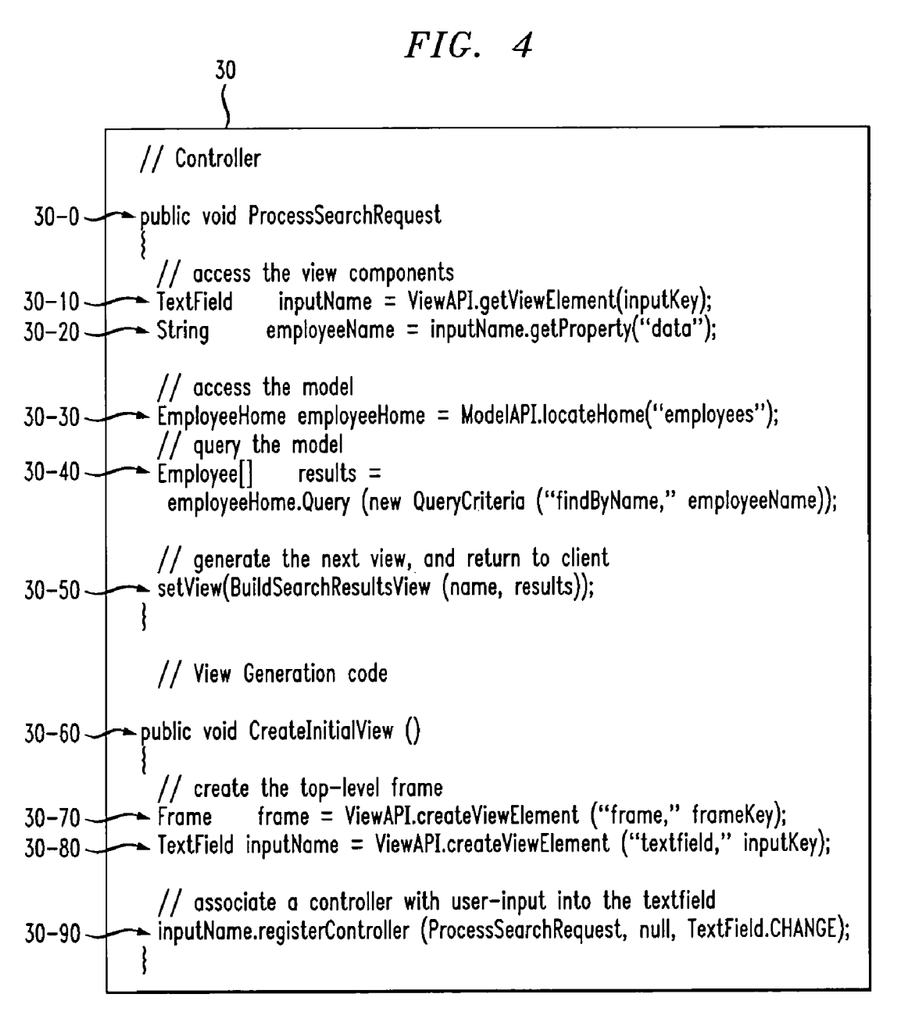
FIG. 4 illustrates a flexible web-application partitioning application written using a View application programming interface and a Model application programming interface to access, respectively, View components and Model elements according to an embodiment of the present invention.

FIG. 4 shows how the FWAPlication 30 of FIG. 1 can be written, using the View API 11 and the Model API 12 to access, respectively, View components and Model elements. In general, the present invention specifies that MVC applications be written as an application in which all Controllers are written using the canonical form. In subsequent figures we shall refer to the program containing: (i) references to a Model and View; (ii) logic to create Views, e.g., CreateInitialView and BuildSearchResultsView of FIG. 4; and (iii) Controllers, e.g., ProcessSearchRequest of FIG. 4, as an FWAPlication or Flexible Web-Application Partitioning Application, and represent the FWAPlication as component 30 of FIG. 1.

As shown in FIG. 4, statement 30-0 represents a FWAPlication Controller named ProcessSearchRequest, and consists of statements 30-10 through 30-50. In statement 30-10, the controller obtains a reference to a text-field view element with key inputKey. In 30-20, the controller obtains the query string containing the name of the employee. In 30-30, a reference to the employee Home is obtained. In 30-40, a query is executed on the employee Home to find the set of employees matching the specified query string. In 30-50, a call is made to a method which creates the new View from the query string and search result set.

Statement 30-60 represents view-generation logic which creates the initial View for the FWAPlication. In statement 30-70, the enclosing frame is created. In 30-80, the text-input field (to contain the search query string entered by the user) is created and inserted into the frame. In 30-90, the logic specifies that the CHANGE event for the text-entry field (invoked when the user modifies the contents of the field) is associated with the Controller ProcessSearchRequest (30-0).

Thus, statements 30-30 and 30-40 reference the Model; statements 30-10 and 30-20 reference the View. Statements 30-50, 30-60, 30-70, 30-80 and 30-90 contain logic that creates or modifies Views. The procedure 30-0 is thus a Controller, and the procedure 30-60 builds a View.

An application, in canonical form, is developed and tested through deployment to a non-distributed environment. This requires the selection of a specific technology to render View components and to construct Model elements. In one embodiment, View components wrap (encapsulate) Java Swing components; and Model elements wrap the Entity-Beans of the Enterprise JavaBeans architecture. Those skilled in the art will realize that many View and Model technologies can be similarly utilized to deploy the canonical form to a non-distributed environment.

The canonical form is used to develop and test an application without regard to distribution and partitioning issues. The development and test activities thus exercise the application's Controller logic, View construction and Model access with respect to sample user interactions. In another portion of the present invention, the canonical form of an application is deployed to a specific client/server environment; optionally, dynamically partitioned so that specific Controllers execute on the client and other Controllers execute on the server; and the deployed form of the application executes in a distributed client/server environment.

Figure 5:
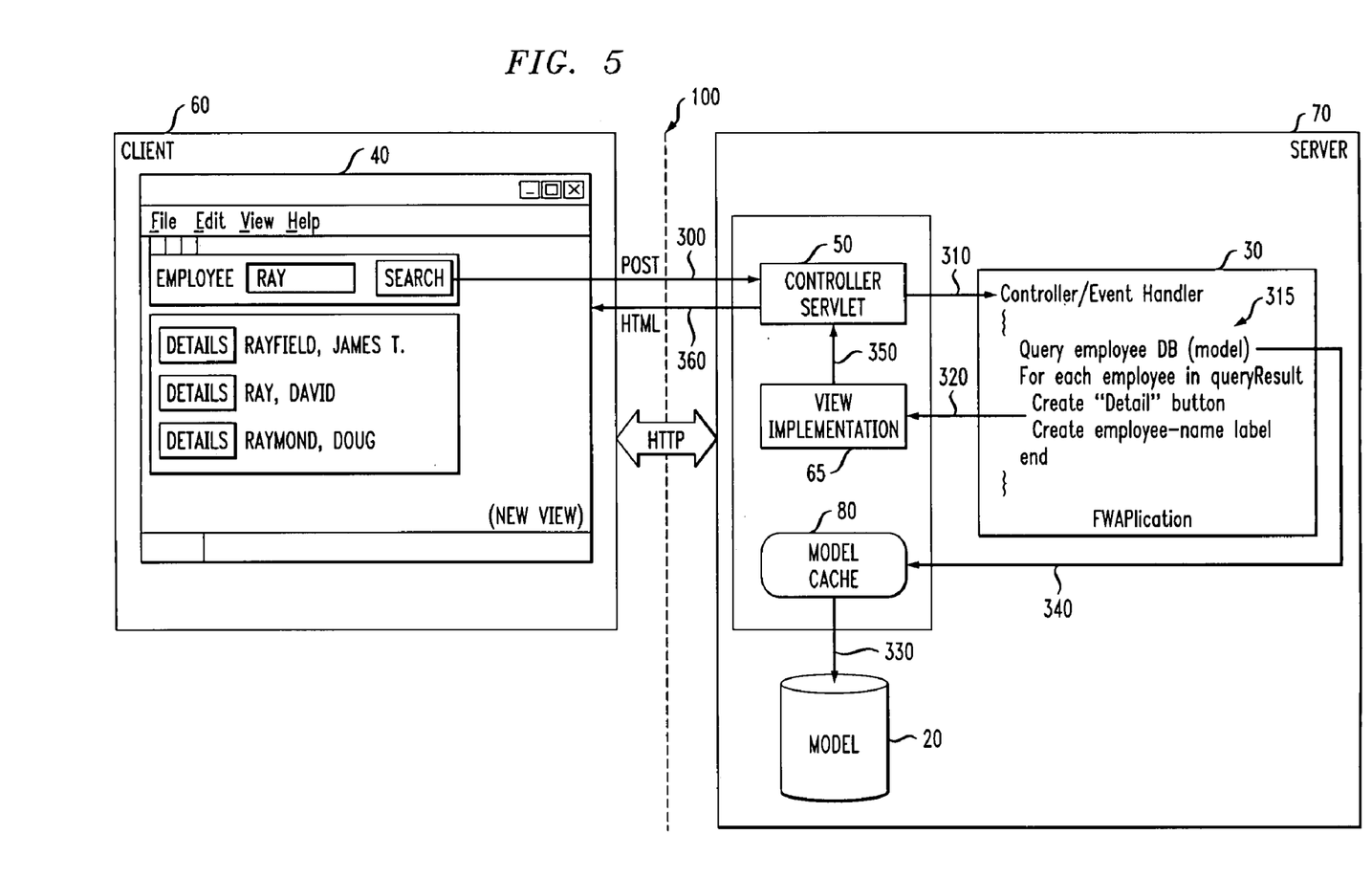
FIG. 5 is a block diagram illustrating how the canonical form of a sample flexible web-application partitioning application can be deployed to a client/server environment in which the Model and Controller execute on a server and the View is rendered on a client device according to an embodiment of the present invention.

FIG. 5 shows how the canonical form of the sample FWAPlication 30 can be deployed to a client/server environment in which the Model and Controller execute on a server 70 and the View is rendered on the client device 60, e.g., a web browser or PDA. That is, in FIG. 5, the FWAPlication 30 executes solely on the server 70, and the View is rendered on a web browser client platform 60.

In general, FIG. 5 illustrates a block diagram of an exemplary client/server system suitable for employing the present invention. The system comprises a client computer system 60 which is configured to run web browser software. It is to be appreciated that any suitable web browser software may be employed and that the methodologies of the invention are not limited to any particular web browser software. Further, as shown in the client/server system of FIG. 5, the web browser communicates over a network 100 with a web server 70. The network 100 may employ a HyperText Transport Protocol (HTTP), as is well known in the art and as is implemented in accordance with the world wide web, however, other suitable protocols and networks may be employed. For example, the client and server may alternatively be connected via a private network, a local area network, or some other suitable network. It is to be appreciated that an example of such a client/server system as illustrated in FIG. 5 may include an arrangement wherein a user at a personal computer or workstation (client) accesses a particular application (e.g., help desk, life insurance underwriting, health insurance pre-certification for medical procedures, and automated teller machines) written in accordance with the present invention and associated with a particular server on the HTTP network in accordance with web browser software loaded and running on the client machine. The client device 60 may alternatively be a PDA or other client-side processing device.

In this "thin-client" deployment arrangement shown in FIG. 5, so-called because neither the Model nor the Controller reside on the client, the FWAPlication 30 executes "as is." That is, the code executing on the server 70 is identical to the code executing under the canonical form deployment. In addition, a controller servlet 50 at the server 70 mediates interaction between the thin-client 60 and the executing FWAPlication 30. Moreover, the implementation of the View components 65 at the server 70 contains code that can render the component and its properties into HTML, which is assumed to be the rendering technology of the client platform 60. For example, a "button" View component is rendered, under thin-client deployment, as <INPUT TYPE=BUTTON NAME=buttonName . . . >. Those skilled in the art will readily recognize that the server-side View components can render any HTML component in this manner. The View implementation thus allows the Controller to access a fully-instantiated, but invisible, View that executes on the server-side. The server-side View can render itself in HTML in such a manner that it can be suitably displayed as the View on the client platform 60.

The client acquires the initial View 10 (FIG. 1) by issuing a HTTP GET operation to the controller servlet 50, specifying that FWAPlication 30 begin execution on the server. The controller servlet asks the server-side FWAPlication to construct the initial View 10 and render it into HTML; the HTML is then returned to the client 60 and rendered (FIG. 1). As part of the HTML, for each event handler that the developer has associated with a View component (via the registerController API of FIG. 4), the View component generates JavaScript code that is attached to the HTML defining the client-side component. The JavaScript associates a FWAPlication Controller with the named component. For example, the "Search" button is associated with the ProcessSearchRequest Controller of FIG. 4.

FIG. 5 also depicts the application flow at the point after the user has interacted with the initial View 10 by first entering the employee name "Ray" and then clicking on the "Search" button. The HTML specifying the initial View contains JavaScript code that issues an HTTP POST operation to the controller servlet 50, transmitting the name of the component and the associated Controller for the user-interaction event, in this case ProcessSearchRequest. The POST operation occurs at step 300. The controller servlet passes this information to the FWAPlication 30 in step 310. The Controller code executes in step 315. This involves the sub-steps of accessing the server-side View components in step 320; accessing a Model cache 80 in step 340, and if necessary, accessing the Model itself in step 330.

As a result of the server-side Controller execution, a new View containing the employee information is constructed on the server, and rendered into HTML in step 350. The controller servlet returns this HTML in step 360 as the result of the client's POST operation, and the new View 40 is rendered on the client platform 60. This generic execution cycle then repeats through the course of the user interacting with the deployed FWAPlication.

Thin-client deployment is one of several possible deployment strategies for a given canonical MVC application; the Model and Controller execute on the server, and the View is rendered on the client side. The present invention, however, also allows for the canonical form of an MVC application to be deployed to a dual-MVC architecture as described in the above-referenced U.S. patent application identified as Ser. No. 09/500,208, filed on Feb. 8, 2000 in the name of Betz et al. and entitled: "Methods and Apparatus for Reducing the Number of Server Interactions in Network-based Applications Using a Dual-MVC Approach;" and in K. Betz, A. Leff and J. Rayfield, "Developing Highly-Responsive User Interfaces with DHTML and Servlets," 19th IEEE International Performance, Computing, and Communications Conference—IPCCC-2000. In the dual-MVC architecture, the Model and the Controller portions of the application can execute (serially) on both the client and the server, thus offering the maximum deployment flexibility. We now explain how, in a preferred embodiment of the present invention, the canonical form is deployed to a dual-MVC technology.

In order for the FWAPlication 30 to execute on the client, a suitable client platform that can both render a View, execute Controllers, and access the Model must exist. One example of such a platform is a web browser enabled with Sun Microsystem™ Java Plug-in technology. Another example is a PDA with an embedded Java Virtual Machine. With such a platform available, deployment of the FWAPlication to the dual-MVC architecture must address two basic situations: one, in which a Controller executes only on the client; and a second, in which Controller execution may optionally begin on the client but complete on the server. Note that the issue of how the application deployer specifies whether a Controller should execute on the client or on the server is handled independently of the FWAPlication itself, e.g., through a file that maps the name of a Controller to a "client versus server" directive.

Figure 6:
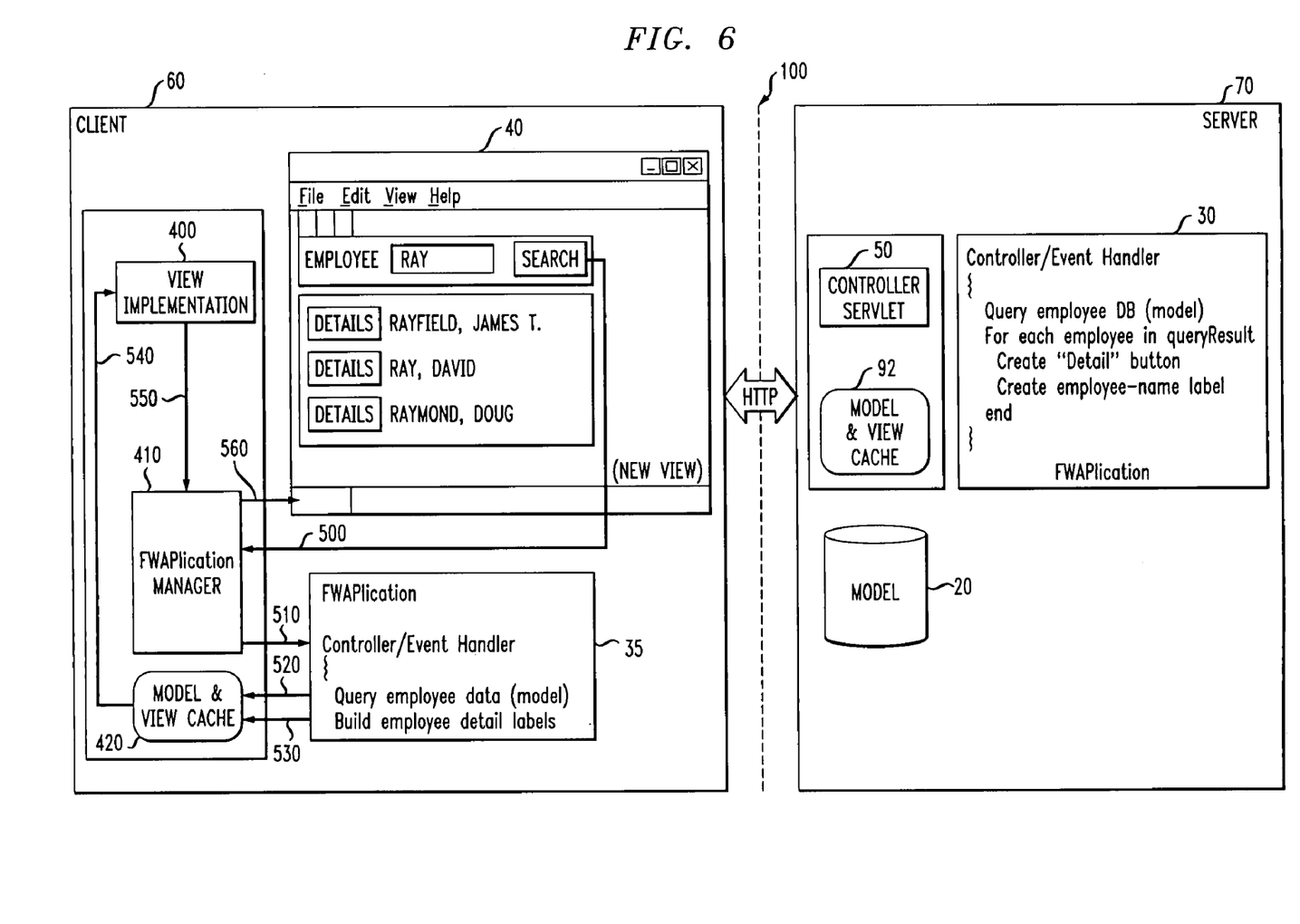
FIG. 6 is a block diagram illustrating the scenario in which a sample flexible web-application partitioning application is deployed to a dual-MVC architecture and a Controller executes on the client platform according to an embodiment of the present invention.

FIG. 6 depicts the steps followed by a Controller executing on the client-side of a dual-MVC application. Note that the FWAPlication code 35 executing on the client platform 60 is a subset (possibly identical) to the FWAPlication code 30 executing on the server 70. In the client environment used in a preferred embodiment, the View components deployed on the client encapsulate the same View technology 400 used on the server side of the FWAPlication, namely, Sun Microsystems™ Java Swing library. Those ordinarily skilled in the art will appreciate that, as in the case of thin-client deployment, other View technologies can be similarly encapsulated by the deployed client-side View components. The deployed View components are maintained in a client-side View cache 420. The persistent Model 20 for the application continues to reside on the server platform 70. In addition, the client platform 60 maintains a Model cache 420 that stores a subset of the Model available on the server.

The client-side Model cache 420 is necessary for the Controllers to execute efficiently (i.e., without constantly communicating with the server) on the client. As shown in FIG. 4, Controllers typically access the Model in the course of their execution. If the Model elements are available in the client cache (i.e., a cache hit), the Controller executes entirely on the client. If required Model elements are not available on the client (i.e., a cache miss), the client-side FWAPlication must ask the server-side for those Model elements.

One of the tasks performed by a client-side FWAPlication Manager 410 is the rendering of the client-side View components 400. In the case of a preferred embodiment, this is done by maintaining a display panel inside an applet that is instantiated in the client browser. As the View changes, the display panel containing the previous View is replaced with another panel that contains the new View.

Various approaches are possible for processing the events that a FWAPlication developer associates (on a per-View-component basis) with a Controller. The developer creates this association via the registerController API of FIG. 4. In a preferred embodiment, the responsibility for event processing is assumed by the client-side FWAPlication Manager 410 in cooperation with the deployed client-side View components 400. This is accomplished by having the View component trap the event and then forward the name and arguments of the associated Controller to the FWAPlication manager. The FWAPlication Manager then determines whether the Controller should execute on the client or server, perhaps using a configuration file that specifies this information.

FIG. 6 also depicts the application flow for scenarios in which the FWAPlication Manager 410 determines that the Controller should execute locally, i.e., on the client platform 60. In FIG. 6, it is assumed that the user has just interacted with the initial View 10 (FIG. 1) by first entering the employee name "Ray" and then clicking on the "Search" button. In step 500, the component forwards the request to the FWAPlication Manager. In step 510, the FWAPlication Manager invokes the associated ProcessSearchRequest Controller (FIG. 4) on the client-side FWAPlication 35. Controller execution involves the sub-steps of accessing, in step 520, the server-side View components from the View cache 420; and accessing, in step 530, the Model cache 420.

Assuming that no Model cache miss occurs, in step 540, the new View 40 is constructed using the client-side implementation of the View library 400. Finally, the new View is passed to the FWAPlication Manager in step 550, and rendered on the client platform in step 560. This generic execution cycle then repeats through the course of the user interacting with the deployed FWAPlication. If a cache miss does occur, the scenario changes to that of dual-MVC, server-side, Controller execution discussed below.

Figure 7:
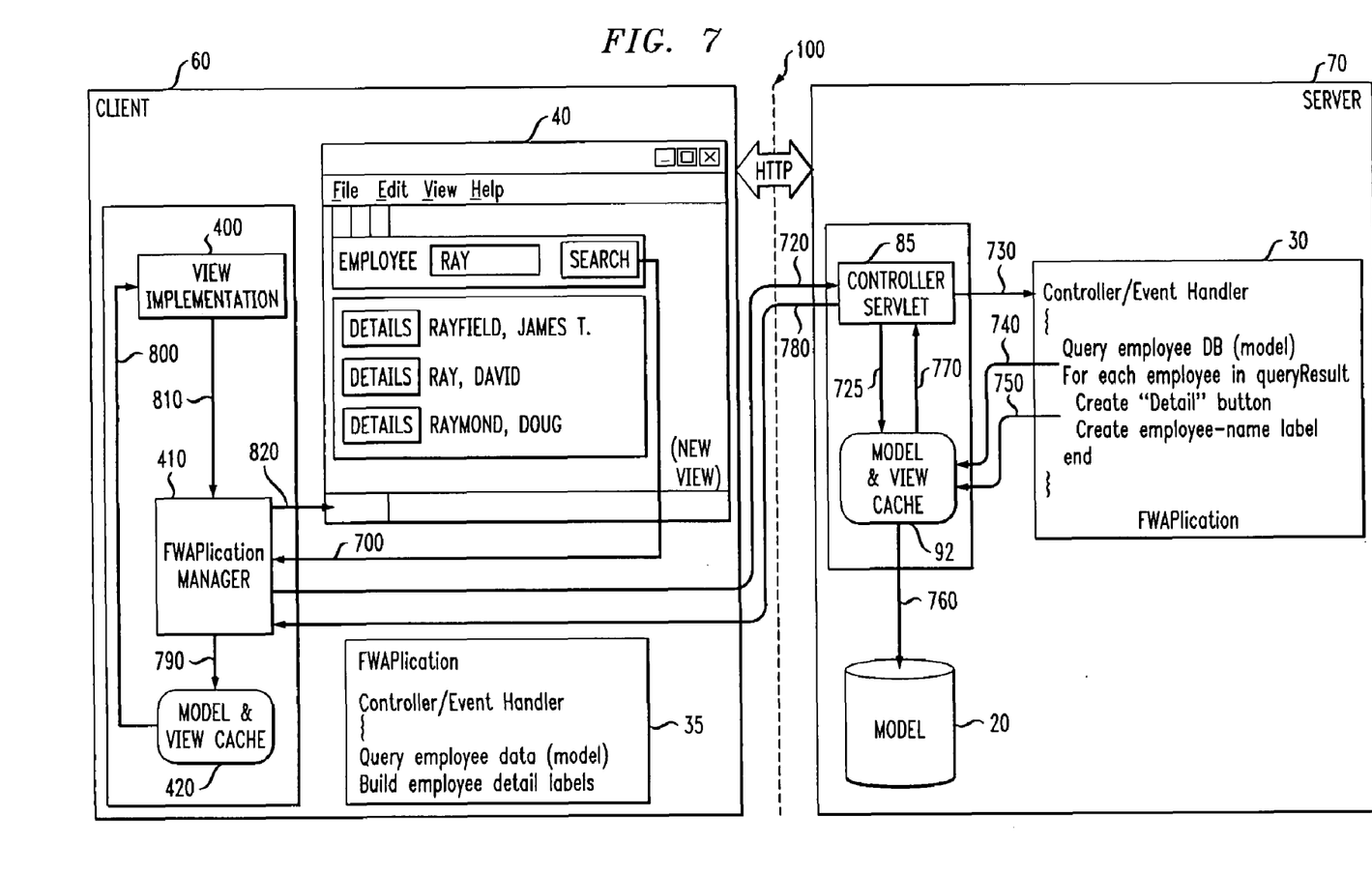
FIG. 7 is a block diagram illustrating the scenario in which a sample flexible web-application partitioning application is deployed to a dual-MVC architecture and a Controller executes on the server platform according to an embodiment of the present invention.

FIG. 7 shows the scenario in which a FWAPlication is deployed to the dual-MVC architecture, and a Controller executes on the server platform 70. In FIG. 7, it is assumed that the user has just interacted with the initial View 10 (FIG. 1) by first entering the employee name "Ray" and then clicking on the "Search" button. In step 700, the component forwards the request to the FWAPlication Manager 410 and the FWAPlication Manager determines that the Controller is to execute on the server. In step 720, the FWAPlication Manager transmits a request to the dual-MVC controller servlet 85 to execute the Controller. This request includes the information needed to synchronize the state of the server-side FWAPlication 30 with that of the client-side FWAPlication 35. In a preferred embodiment, the information includes: a server-side version of the View and changes to the client-side Model 420. The server-side version of the View does not wrap visible View components, i.e., components that can be rendered on a user display such as a web browser. Instead, the server-side version of the View contains only the properties and state needed to create a corresponding, client-side, View that wraps visible View components. In step 725, the controller servlet 85 synchronizes the state of the server-side View components to that of the client-side View. In addition, in step 725, if the client-side FWAPlication 35 has changed the state of elements in its Model cache 420, these changes must be propagated to the corresponding elements of the server-side Model cache 92 and the server-side persistent Model 20.

Once the server-side FWAPlication 30 is synchronized with the current state of the application, it executes in step 730 the ProcessSearchRequest associated with the user's interaction with the "Search" button. This involves the sub-steps of: accessing the server-side View components 92 in step 740; accessing a Model cache 92 in step 750; and, if necessary, accessing the persistent Model 20 itself in step 760. As a result of the server-side Controller execution, a new View containing the employee information is constructed on the server as a set of server-side View components 770. In step 780, the controller servlet 85 returns the new View as the result of the client's POST operation to the client-side FWAPlication Manager 410 which "reconstitutes," in steps 790 and 800, the server-side View as a client-side View whose components wrap a concrete View technology, such as Sun Microsystem™ Swing library. In addition, in step 790, if the server-side Model has changed the state of elements in its persistent Model, these changes must be propagated to the client-side FWAPlication Manager 410 so that it can update the corresponding Model elements in its Model cache 420. Optionally, the server-side FWAPlication may have pre-fetched Model elements on behalf of the client-side FWAPlication and "piggybacked" these elements in the response to the client's request for Controller execution. In step 810, the new View 40 is passed to the FWAPlication Manager, and rendered on the client platform 60 in step 820. This generic execution cycle then repeats through the course of the user interacting with the deployed FWAPlication.

Figure 8:
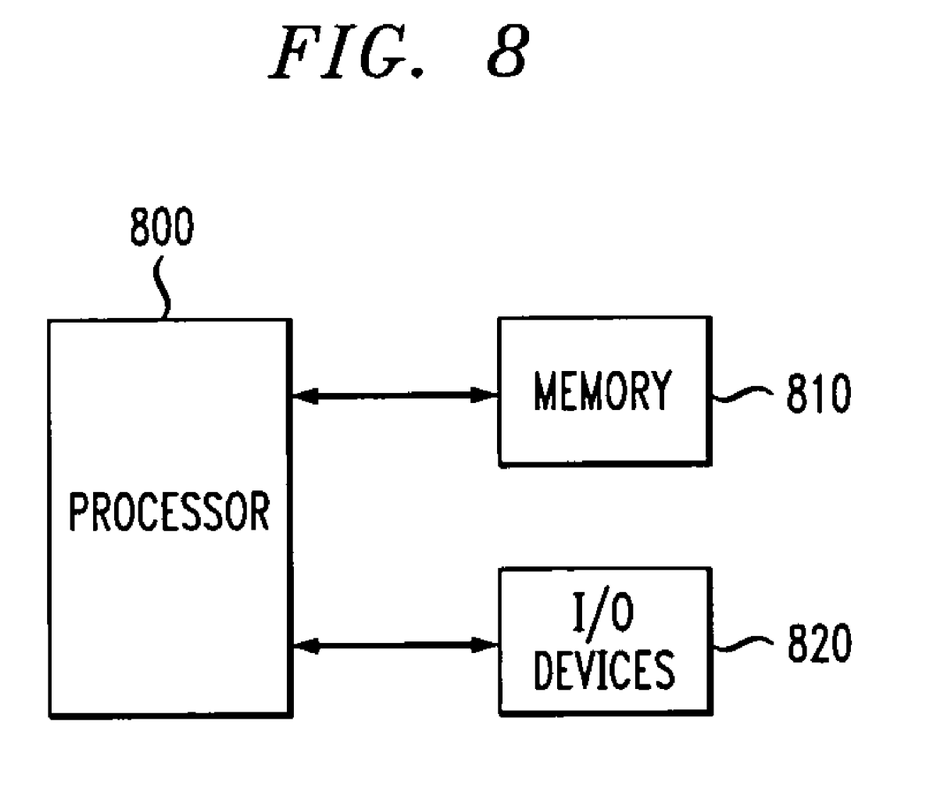
FIG. 8 is a block diagram illustrating a hardware implementation of a client computer system and/or server computer system suitable for implementing the MVC applications methodologies of the present invention.

Referring now to FIG. 8, a block diagram is shown illustrating a hardware implementation of a client computer system and/or server computer system suitable for implementing the MVC applications methodologies of the present invention. As shown, both the client system and server system may be implemented in accordance with a processor 800, a memory 810 and I/O devices 820. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. For example, the functional elements of the client-side computing device 60 and the server computer system 70 shown in FIGS. 5, 6 and 7 may be respectively implemented in accordance with a hardware architecture as depicted in FIG. 8.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use in a client/server environment of generating a user-interactive application that is dynamically partitionable when deployed in the client/server environment, the method comprising the steps of:

specifying that access to a model associated with the user-interactive application be performed through an application programming interface permitting location-independent allocation and access of model storage on the client and the server; and specifying that access to view generating logic associated with the user-interactive application be performed through an application programming interface permitting location-independent allocation and access of view elements on the client and the server;

wherein partitioning of the user-interactive application is changeable during execution.

2. The method of claim 1, wherein at least one of the application programming interface associated with the model and the application programming interface associated with the view generating logic comprises a process to create one or more elements.

3. The method of claim 1, wherein at least one of the application programming interface associated with the model and the application programming interface associated with the view generating logic comprises a process to query one or more elements.

4. The method of claim 1, wherein at least one of the application programming interface associated with the model and the application programming interface associated with the view generating logic comprises a process to delete one or more elements.

5. The method of claim 1, wherein at least one of the application programming interface associated with the model and the application programming interface associated with the view generating logic comprises a process to read at least one of a property and a state associated with one or more elements.

6. The method of claim 1, wherein at least one of the application programming interface associated with the model and the application programming interface associated with the view generating logic comprises a process to update at least one of a property and a state associated with one or more elements.

7. The method of claim 1, wherein one or more model elements associated with the user-interactive application are individually identifiable by respective associated keys.

8. The method of claim 1, wherein the one or more view elements associated with the user-interactive application are individually identifiable by respective associated keys.

9. The method of claim 1, wherein the application programming interface associated with the model has a structured lifecycle associated therewith.

10. The method of claim 1, wherein the application programming interface associated with the view generating logic has a structured lifecycle associated therewith.

11. Apparatus for deploying a user-interactive application in a client/server environment, the apparatus comprising:
a server having at least one processor operative to execute at least a portion of the user-interactive application, wherein the user-interactive application: (i) specifies that access to a model associated with the user-interactive application be performed through an application programming interface permitting location-independent allocation and access of model storage on a client device and the server; and (ii) specifies that access to view generating logic associated with the user-interactive application be performed through an application programming interface permitting location-independent allocation and access of view components on the client device and the server, wherein partitioning of the user-interactive application is changeable during execution.

12. The apparatus of claim 11, wherein the model and a controller logic associated with the user-interactive application execute on the server and at least one view generated by the view generating logic is rendered on the client device.

13. The apparatus of claim 11, wherein a controller logic associated with the user-interactive application executes on the client device.

14. The apparatus of claim 11, wherein a controller logic associated with the user-interactive application executes on the server.

15. The apparatus of claim 11, wherein the client device comprises a web browser.

16. The apparatus of claim 11, wherein the client device comprises a personal digital assistant.

17. The apparatus of claim 11, wherein the view components encapsulate Java Swing components.

18. The apparatus of claim 11, wherein elements associated with the model encapsulate EntityBeans of an Enterprise JavaBeans architecture.

19. The apparatus of claim 11, wherein the view generating logic renders a view in HyperText Markup Language.

20. Apparatus for deploying a user-interactive application in a client/server environment, the apparatus comprising:
a client device having at least one processor operative to execute at least a portion of the user-interactive application, wherein the user-interactive application: (i) specifies that access to a model associated with the user-interactive application be performed through an application programming interface permitting location-independent allocation and access of model storage on the client device and the server; and (ii) specifies that access to view generating logic associated with the user-interactive application be performed through an application programming interface permitting location-independent allocation and access of view components on the client device and the server;
wherein partitioning of the user-interactive application is changeable during execution.

21. The apparatus of claim 20, wherein the model and a controller logic associated with the user-interactive application execute on the server and at least one view generated by the view generating logic is rendered on the client device.

22. The apparatus of claim 20, wherein a controller logic associated with the user-interactive application executes on the client device.

23. The apparatus of claim 20, wherein a controller logic associated with the user-interactive application executes on the server.

24. The apparatus of claim 20, wherein the client device comprises a web browser.

25. The apparatus of claim 20, wherein the client device comprises a personal digital assistant.

26. The apparatus of claim 20, wherein the view components encapsulate Java Swing components.

27. The apparatus of claim 20, wherein elements associated with the model encapsulate EntityBeans of the Enterprise JavaBeans architecture.

28. The apparatus of claim 20, wherein the view generating logic renders a view in HyperText Markup Language.

29. A network-based system:
a server having at least one processor responsive to a user-interactive application; and
a client device having at least one processor responsive to the user-interactive application;
wherein the user-interactive application: (i) specifies that access to a model associated with the user-interactive application be performed through an application programming interface permitting location-independent allocation and access of model storage on the client device and the server; and (ii) specifies that access to view generating logic associated with the user-interactive application be performed through an application programming interface permitting location-independent allocation and access of view components on the client device and the server; and further wherein partitioning of the user-interactive application is changeable during execution.

30. An article of manufacture for use in a computing device environment of generating a user-interactive application that is dynamically partitionable when deployed, comprising a machine readable medium containing one or more programs which when executed implement the steps of:
specifying that access to a model associated with the user-interactive application be performed through an application programming interface permitting location-independent allocation and access of model storage in accordance with execution of the user-interactive application; and
specifying that access to view generating logic associated with the user-interactive application be performed through an application programming interface permitting location-independent allocation and access of view components in accordance with execution of the user-interactive application;
wherein partitioning of the user-interactive application is changeable during execution.

31. A method for use in a computing device environment of generating a user-interactive application that is dynamically partitionable when deployed, the method comprising the steps of:
providing an application programming interface such that access to a model associated with the user-interactive application is performed through the application programming interface, and wherein the application programming interface permits location-independent allocation and access of model storage in accordance with execution of the user-interactive application; and providing an application programming interface such that access to view generating logic associated with the user-interactive application is performed through the application programming interface, and wherein the application programming interface permits location-independent allocation and access of view components in accordance with execution of the user-interactive application;

wherein partitioning of the user-interactive application is changeable during execution.

* * * * *